(12) United States Patent
Valente et al.

(10) Patent No.: US 8,199,808 B2
(45) Date of Patent: Jun. 12, 2012

(54) DECODING METHOD AND DECODER WITH ROUNDING MEANS

(75) Inventors: Stephane Valente, Paris (FR); Nicolas Vanhaelewyn, Suresnes (FR)

(73) Assignee: NXP B.V., Eindhoven (NL)

( * ) Notice: Subject to any disclaimer, the term of this patent is extended or adjusted under 35 U.S.C. 154(b) by 1218 days.

(21) Appl. No.: 11/917,022

(22) PCT Filed: Jun. 7, 2006

(86) PCT No.: PCT/IB2006/051815
§ 371 (c)(1),
(2), (4) Date: Dec. 10, 2007

(87) PCT Pub. No.: WO2006/131891
PCT Pub. Date: Dec. 14, 2006

(65) Prior Publication Data
US 2010/0135394 A1    Jun. 3, 2010

(30) Foreign Application Priority Data

Jun. 10, 2005 (EP) .................................... 05300473

(51) Int. Cl.
*H04N 7/12* (2006.01)
(52) U.S. Cl. ................... 375/240.01; 382/236
(58) Field of Classification Search ......... 375/240–241; 382/236, 238
See application file for complete search history.

(56) References Cited

U.S. PATENT DOCUMENTS

| | | | |
|---|---|---|---|
| 6,282,243 B1 | 8/2001 | Kazui et al. | |
| 2003/0194010 A1 | 10/2003 | Mukerjee et al. | |
| 2004/0045030 A1* | 3/2004 | Reynolds et al. | 725/110 |
| 2004/0057521 A1 | 3/2004 | Brown et al. | |
| 2004/0126023 A1 | 7/2004 | Nakaya | |
| 2004/0218674 A1* | 11/2004 | Kondo et al. | 375/240.16 |
| 2005/0117810 A1* | 6/2005 | Bjontegaard | 382/236 |
| 2008/0075166 A1* | 3/2008 | Gish et al. | 375/240.13 |

FOREIGN PATENT DOCUMENTS

| | | |
|---|---|---|
| CN | 1169362 C | 9/1998 |
| EP | 0856991 A2 | 8/1998 |
| EP | 1353514 A2 | 10/2003 |
| GB | 2301972 A | 12/1996 |
| JP | 2003333604 A1 | 11/2003 |
| WO | 02078353 A1 | 10/2002 |

* cited by examiner

*Primary Examiner* — Pao Sinkantarakorn

(57) ABSTRACT

The present invention relates to a video decoder for decoding a bit stream corresponding to pictures of a video signal. The invention is such that, motion vectors having values coded at a nominal resolution in the bit stream, said video decoder includes a rounding unit for rounding decoded nominal motion vectors to a resolution different from the nominal resolution in a way that minimizes the error accumulation along prediction path by assigning to rounded successive motion vectors along the prediction path, successive values such that their average value is equal to the value of the nominal motion vector.

12 Claims, 1 Drawing Sheet

DECODING METHOD AND DECODER WITH ROUNDING MEANS

FIELD OF THE INVENTION

The present invention relates to a video decoder for decoding a bit stream corresponding to pictures of a video signal, and more particularly to an MPEG-4 decoder.

BACKGROUND OF THE INVENTION

The MPEG-4 standard defines a syntax for video bit streams which allows interoperability between various encoders and decoders. Standards describe many video tools, but implementing all of them can result in a too high complexity for most applications. To offer more flexibility in the choice of available tools and encoder/decoder complexity, the standard further defines profiles, which are subsets of the syntax limited to particular tools.

For instance, the Simple Profile (SP) is a subset of the entire bit stream syntax which includes in MPEG terminology: I and P VOPs, AC/DC prediction, 1 or 4 motion vectors per macroblock, unrestricted motion vectors and half pixel motion compensation. The Advanced Simple Profile (ASP) is a superset of the SP syntax: it includes the SP coding tools, and adds B VOPs, global motion compensation, interlaced pictures and quarter pixel motion compensation where interpolation filters are different from the ones used in half-pixel motion compensation.

In some devices with limited CPU resources or power resources, it can be advantageous to use hardware accelerated functions to carry on some of the decoding operations, even if the hardware IPs are not capable to perform the decoding operations in a conformant way. This results in decoding errors that accumulate and create a drift in the resulting images.

The document US 2004/0057521 discloses a transcoder that converts a bit stream into a corresponding but differently coded bit stream. Said transcoder implements a rounding method where any quarter pixel motion vector of the input is converted to the nearest half pixel value or where the output vector is made the largest valid output vector with the same direction as the input vector. The use of such rounding policies leads to a drift in successive images, said drift being created along the prediction path.

SUMMARY OF THE INVENTION

Accordingly, it is an object of the invention to provide a video decoder that limits the creation of penalizing drift in decoded images.

To this end, there is provided a video decoder where, motion vectors having values coded at a nominal resolution in the bit stream, said video decoder includes means for rounding decoded nominal motion vectors to a resolution different from the nominal resolution in a way that minimizes the error accumulation along prediction path by giving to rounded successive motion vectors along the prediction path, successive values such that their average value is equal to the value of the nominal motion vector.

In an embodiment of the invention, means for rounding nominal motion vectors alternates at least two motion vector rounding policies from one picture to the other picture of the same type.

In an other embodiment, said means (RND) for rounding nominal motion vectors alternates at least two motion vector rounding policies from one reference picture to the other reference picture when non-reference pictures are present. In fact, in case of, for instance, a structure IBBBPBBBP, only P images are reference pictures, the drifts must be minimized on P pictures.

The invention also relates to a method for decoding a bit stream in pictures of a video signal. According to the invention, motion vectors having values coded at a nominal resolution in the bit stream, said method includes a rounding step for rounding decoded nominal motion vectors to a resolution different from the nominal resolution in a way that minimizes the error accumulation along prediction path by giving to rounded successive motion vectors along the prediction path, successive values such that their average value is equal to the value of the nominal motion vector.

The invention also relates to a computer program product comprising program instructions for implementing, when said program is executed by a processor, a decoding method as disclosed above.

The invention finds application in the playback of video standards as MPEG-4 and DivX streams on mobile phones, in which a video encoder as described above is advantageously implemented.

In the present description and claims the expression "pictures" is used to designate pictures as well as frames.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

Figure 1:
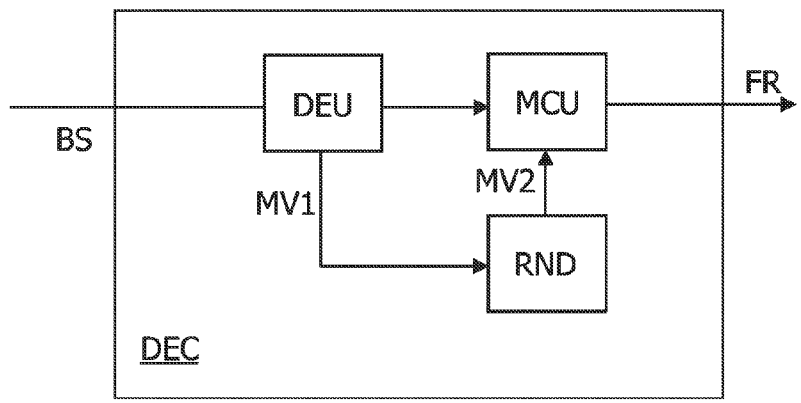
FIG. 1 illustrates a video decoder according to the invention, in which the rounding process is performed.

FIG. 1 schematically represents a video decoder DEC including a decoding unit DEU for decoding a bit stream BS corresponding to pictures FR of a video signal. Said bit stream BS includes coded data to be used, once decoded, in the reconstruction of macroblocks or blocks of pictures. According to standards, said data includes textures and motion vectors for blocks of P and B type that are predicted from data of a previous reference picture. The invention concerns the way motion vectors are extracted from the bit stream and made conform to requirements of a motion compensation unit MCU or any other video processing or displaying unit that follows the decoding unit DEU of the video decoder DEC.

Figure 2A:
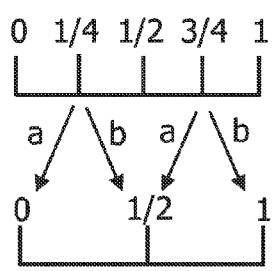
FIGS. 2a and 2b give examples of implementations of the invention for a decreasing resolution.

Effectively, said motion vectors MV1 are coded according to a nominal resolution that is indicated in the bit stream. Nevertheless devices that are likely to receive the video signal do not all have the possibility to process the nominal resolution. This is, for example, the case when the bit stream was coded by a device using a quarter pixel motion compensation and when the video decoder includes a motion compensation unit that uses a half pixel motion compensation. This last example and others will be developed with FIGS. 2 and 3.

For illustration of the invention, it is considered that the motion compensation step realized in said motion compensation unit MCU is carried on with half-pixel motion vectors and half-pixel interpolation filters while receiving data coded with a quarter pixel resolution. In the prior art, as described, for example, in subclause 7.6.2.1 of the MPEG-4 standard, said half-pixel interpolation filter rounds the quarter pixel resolution motion vectors to half-pixel. Such a rounding is performed to the next half-pixel position or integer pixel position as shown in table 1. It is equally possible to perform a rounding to the previous half pixel position or previous integer pixel position as shown in table 2.

TABLE 1

| Fourth pixel position | 0 | 1/4 | 1/2 | 3/4 |
|---|---|---|---|---|
| Resulting rounded position | 0 | 1/2 | 1/2 | 1 |

TABLE 2

| Fourth pixel position | 0 | 1/4 | 1/2 | 3/4 |
|---|---|---|---|---|
| Resulting rounded position | 0 | 0 | 1/2 | 1/2 |

For motion vectors that point to 1/4 or 3/4 positions, this rounding policy results in a displacement mismatch of a 1/4 pixel during the motion compensation. Unfortunately, these errors can accumulate from one picture to the other due to the predictive nature of MPEG video technologies. Thus in areas undergoing uniform unidirectional motion, which is a common case in video sequences, it is observed that, after several pictures, the drift is such that object textures are spread over several pixels. This is clearly due to the fact that displacement errors can accumulate in the same direction.

The invention is then disclosed in a similar context corresponding to a pseudo ASP decoder which performs quarter pixel motion compensation with half pixel motion compensation functionalities.

According to an embodiment of the invention it is proposed to minimize the error accumulation along the prediction path and thus to reduce the drift effect by alternating the rounding policies of table 1 and table 2 across pictures of the same type, i.e. to P or B pictures. By doing so, displacements mismatches have a different direction from one picture to the other in areas of uniform unidirectional motion. Consequently, their accumulation tends toward zero, resulting on less noticeable drift. In this embodiment, illustrated in FIG. 2a, two simple rounding policies, carried out in FIG. 1 by means of a rounding unit RND, are illustrated by (a) and (b) arrows on said FIG. 2a.

Figure 2B:
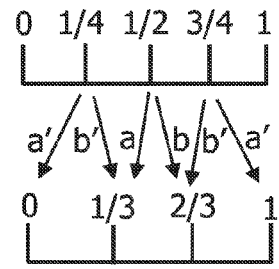

It is also possible to implement more complex rounding policies (a') and (b') as illustrated in FIG. 2b. As illustrated, a quarter pixel resolution has then to be transformed in a third pixel resolution. In this case, two different problems are met. The first one concerns the position 1/2 that can be processed using (a) and (b) policies as described above. The second one concerns position 1/4 and 3/4. It is possible to round these positions to the closest third pixel or integer pixel positions that are respectively 1/3 and 2/3. Phenomena similar to the one evoked above are also observed and a drift is generated in areas of uniform unidirectional motion.

To solve such a problem, it is possible to use weighted alternated rounding policies as (a'), that rounds 1/4 to 0 and 3/4 to 1, and (b'), that rounds 1/4 to 1/3 and 3/4 to 2/3. In the example of FIG. 2b, rounding policy (a') is alternated with policy (b') but used twice less than policy (b'). In this way, the way the rounding unit alternates between the two policies enables the average drift to tend to zero.

Figure 3:
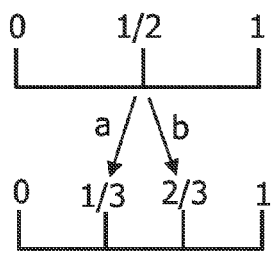
FIG. 3 gives an example of an implementation of the invention for an increasing resolution.

As illustrated in FIG. 3, the invention may also be implemented in the case of an increasing resolution. For example, in the case of the reception of a video signal coded with a half pixel resolution by a device having third pixel resolution functionalities. In this case, according to the invention, rounding policies (a) and (b) that respectively round the position 1/2 to position 1/3 and to position 2/3 are advantageously alternated in order to round the 1/2 position while minimizing the error accumulation. Thus the rounding unit is such that it changes the rounding policy in a way that minimizes the error accumulation along the prediction path. It is for example done between pictures that are used as references for other pictures. In particular, in an MPEG-4 part-2 decoder, this is equivalent to saying from one P picture to the next P picture.

The invention provides the possibility to use half pixel motion compensation functionalities or any local resolution motion compensation functionalities without compromising the final image quality. The invention is particularly interesting for processing of high resolution video on mobile devices like mobile phones only presenting low resolution functionalities.

It is to be understood that the present invention is not limited to the aforementioned embodiments and variations and modifications may be made without departing from the spirit and scope of the invention as defined in the appended claims. In this respect, the following closing remarks are made.

There are numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the method of processing the drift frequency in accordance with the invention.

Said hardware or software items can be implemented in several manners, such as by means of wired electronic circuits or by means of an integrated circuit that is suitably programmed respectively.

Any reference sign in the following claims should not be construed as limiting the claim. It will be obvious that the use of the verb "to include" and its conjugations do not exclude the presence of any other steps or elements besides those defined in any claim. The article "a" or "an" preceding an element or step does not exclude the presence of a plurality of such elements or steps.

The invention claimed is:

1. A video decoder for decoding a bit stream corresponding to pictures of a video signal, characterized by motion vectors having values coded at a nominal resolution in the bit stream, said video decoder comprising:
   a signal-input line configured to receive the bit stream;
   means for rounding decoded nominal motion vectors to a resolution different from the nominal resolution to lessen the error accumulation along a prediction path by assigning to rounded successive motion vectors along the prediction path, successive values such that the average value of the rounded motion vectors is equal to the value of the nominal motion vector.

2. A video decoder as claimed in claim 1, in which said means for rounding nominal motion vectors alternates at least two motion vector rounding policies from one picture to the other picture of the same type.

3. A video decoder as claimed in claim 1, in which said means for rounding nominal motion vectors alternates at least two motion vector rounding policies from one reference picture to the other reference picture.

4. A mobile device including a video decoder as claimed in claim 1.

5. The video decoder of claim 1, wherein the bit stream is a MPEG-4 bit stream.

6. The video decoder of claim 1, wherein the bit stream is a DivX bit stream.

7. A method for decoding a bit stream corresponding to pictures of a video signal, characterized by motion vectors having values coded at a nominal resolution in the bit stream, the decoding method comprising:
   rounding decoded nominal motion vectors to a resolution different from the nominal resolution in a way that minimizes the error accumulation along prediction path by and including assigning to rounded successive motion vectors along the prediction path, successive values such that the average value of the rounded motion vectors is equal to the value of the nominal motion vector.

8. A non-transitory computer program product comprising program instructions for implementing, when said program is executed by a processor, a decoding method as claimed in claim 7.

9. The method of claim 7, wherein the bit stream is a MPEG-4 bit stream.

10. The method of claim 7, wherein the bit stream is a DivX bit stream.

11. A video decoder for decoding a bit stream corresponding to pictures of a video signal, characterized by motion vectors having values coded at a nominal resolution in the bit stream, the video decoder comprising:
    a signal-input line configured to receive the bit stream;
    a rounding circuit configured and arranged to decoded nominal motion vectors to a resolution different from the nominal resolution by using at least two motion vector rounding policies, the at least two rounding policies providing sufficient video quality by rounding the motion vectors to values, including fractional values, to lessen the error accumulation along a prediction path by assigning to rounded successive motion vectors along the prediction path successive values such that the average value of the rounded motion vectors is equal to the value of the nominal motion vector.

12. A method for decoding a bit stream corresponding to pictures of a video signal, characterized by motion vectors having values coded at a nominal resolution in the bit stream, the decoding method comprising:
    rounding decoded nominal motion vectors to a resolution different from the nominal resolution by
    using at least two motion vector rounding policies, the at least to rounding policies providing sufficient video quality by rounding the motion vectors to fractional integer values in a way that lessens the error accumulation along prediction path by assigning to rounded successive motion vectors along the prediction path successive values such that the average value of the rounded motion vectors is equal to the value of the nominal motion vector.

\* \* \* \* \*